MODULE ASSEMBLY
Filed April 11, 1956
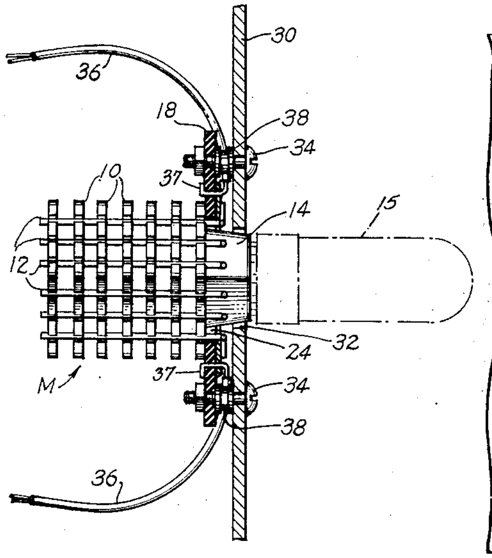
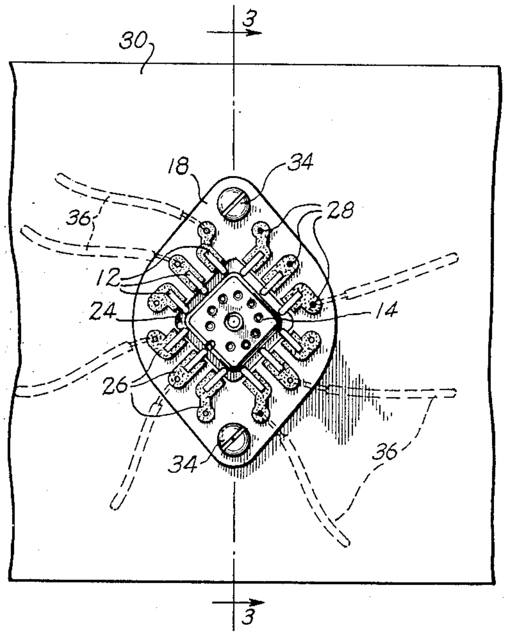
Fig. 1
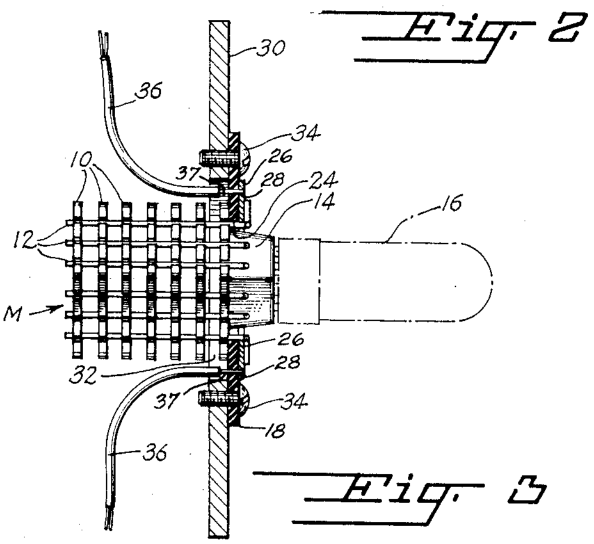
Fig. 2 Fig. 3
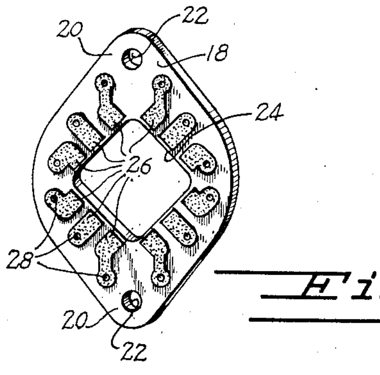
Fig. 4
INVENTOR.
Melvin C. Lutton
BY
Donald P. Smith
Attorney 2,905,920

MODULE ASSEMBLY

Melvin C. Lutton, Silver Spring, Md., assignor to ACF Industries, Incorporated, New York, N.Y., a corporation of New Jersey Application April 11, 1956, Serial No. 577,479

3 Claims. (Cl. 339—17)

This invention relates generally to electronic circuitry and more particularly to the type of circuitry utilizing the modular or packaged type of circuitry.

In connection with the modern mass production of electronic equipment the modular technique has been developed. The usual type of module comprises a plurality of wafers or plates arranged parallel one to another and held fixed together by means of an array of conductive riser wires disposed in notches about the periphery of the plates and soldered thereto. The purpose of the stack of plates is to provide surfaces on which to accommodate electrical components, and the riser wires are used to afford the conductors to which external wiring may be connected, and also to act as a mechanical support for the plates. The module is an easily handled unit, lends itself well to fabrication by automatic machinery, and has been shown to be quite versatile in use. The units are currently being fabricated with any number of plates depending upon the number and kind of electrical component to be supported and the particular circuit application of the element. In general a module finds its setting when used with printed circuitry of the type wherein conductive paths are formed by electrodeposition on an insulating planar board and modules are fixed to the board by passing the riser wires through holes formed in the board to interconnect with selected interrupted conductive paths, the riser wires being bent back upon themselves and soldered to the selected conductive paths.

As will be readily appreciated it is sometimes necessary and desirable to utilize a module or a plurality of modules in a conventional chassis type circuit using the ordinary wires commonly found thereon. If for example a single stage of an amplifier circuit were found to be easily fabricated by the modular technique and were to be introduced into an existing conventional circuit then a structure and method of interconnection between the several wiring concepts must necessarily be provided. This invention solves the problem of blending the modular concept into an existing circuit constructed on a conventional chassis. As will later be more fully explained, the invention provides an adapter having a configuration selected to readily lend itself to insertion or assembly with a conventional chassis and to carry thereon as an entity a module which may consist of a complete packaged circuit.

It is accordingly a broad object of this invention to provide a novel module assembly.

Other objects and advantages will be in part obvious and in part pointed out in the following specification when taken in connection with the drawing in which:

Figure 1 is a side elevation showing a module mounted on a chassis in accordance with an embodiment of this invention.

Figure 2 is a plan view of a modification of the structure of Figure 1.

Figure 3 is a side elevation view of the assembly taken on lines 3—3 of Figure 2 and looking in the direction of the arrows.

Figure 4 is a perspective view illustrating a module adapter member used in the structure of Figures 1 through 3.

Referring now to the drawings wherein like reference characters designate like or corresponding parts throughout a module M is illustrated in Figure 1 to consist of a plurality of wafers 10 held in spaced apart relationship by an array of riser wires 12. The wires are disposed in kerfs formed at the edges of the plates and are bonded thereto by soldering or any other suitable method. The plates are adapted to receive and support thereon electrical components (not shown), and a tube socket 14 is shown affixed to one end of the module to carry in the usual manner a discharge device, as shown in phantom at 15. This latter device and socket is entirely optional but it should be understood that the module represents a complete and self-sufficient packaged stage of circuitry, usually being one stage of a multi-stage circuit.

The connecting member 18, best seen in Figure 4, comprises an insulating planar element of generally circular configuration and having formed integral therewith a plurality of oppositely disposed ears 20 pierced with apertures 22 for a purpose as will later be more fully explained. Substantially at the mid point of the member 18 is formed an aperture 24 in this case being of generally square configuration but which may take any quadrilateral form, and having radiating outwardly therefrom an array of conductive paths 26 substantially as shown. As will be readily seen the aperture 24 interrupts the several conductive paths at one end thereof. A plurality of apertures 28 are formed through member 18, with each aperture extending through a different path 26 at its outer end.

Figure 1 shows in greater detail the module-chassis assembly organization. Reference character 30 designates generally a sheet metal chassis of the conventional type having a hole 32 formed therein; and member 18 secured thereto by bolts 34 piercing the opposed ears and the chassis. Spacing bushings 38 hold the member 18 spaced in a plane parallel to the chassis to receive connecting wires therebetween. The module M is affixed to the member 18 by passing the array of conductive riser wires 12 through the aperture 24 and thereafter bending the risers back upon themselves to interlock at the edge of the aperture and engage against the several conductive paths 26. The interconnection between the ends of the risers and the conductive paths is insured by applying solder thereto. In the assembled position the module is retained against the chassis with the discharge tube socket assembly penetrating the aperture 32 and extending on the opposite side of the chassis from the module body.

Interconnections between a conventional circuit carried on the chassis and the modularized stage introduced by the foregoing organization are readily made by removing the insulation from the ends 37 of a number of selected wires 36 and passing such ends between member 18 and the chassis 30 and through the apertures 28 formed in the member 18 at the ends of the conductive paths 26 remote from the module riser wires. The ends 37 of wires 36 are then soldered to the respective conductive paths 26. The species thus far illustrated lends itself to existing wiring practice as it is conventional to provide most of the connecting wires in a chassis on the surface opposite to that carrying the discharge tubes and larger components. However, the mounting device disclosed herein may readily be secured to either surface of a chassis as will now be explained.

Figures 2 and 3 taken together show the member 18 secured to the other surface of chassis 30 by mounting bolts 34. In this variation the aperture 32 is necessarily formed to be large enough to pass the wafers 10 of the module and the ends 37 connecting wires 36 are passed through apertures 28 penetrating both chassis 30 and member 18 to enter the passages 28 to be soldered to the selected conductive paths 26.

A discharge tube 16 is shown in phantom outline supported by the socket 14 and extending from the surface of the chassis. The module is mounted in member 18 by the method previously described i.e., by passing the assemblage of riser wires 12 through aperture 24 and bending them back upon themselves to interlock with the edges thereof and engage against selected conductive paths 26.

The instant invention provides a novel organization to intermix conventional with packaged circuitry and lends itself readily to the adaptation of a stage, or a plurality of stages of modularized circuits, into existing conventional electronic construction. Substantial savings have been realized by the use of the disclosed invention in that the modern efficient and economical packaged techniques may be readily introduced into an existing chassis construction without necessarily re-designing the complete organization. It is to be understood that the foregoing is given by way of illustrating examples only rather than by way of limitation, and without departing from the invention the details thereof may be varied within the scope of the appended claims.

What I claim is:

1. A module assembly comprising a module, said module including a multiplicity of spaced wafers, a plurality of riser wires forming connections between said wafers, each of said riser wires projecting at one end beyond said module, an insulating planar member formed with an aperture, a plurality of spaced deposits of conductive material on one surface of said planar member, said conductive deposits extending from said aperture and radiating outwardly to terminal points thereof, said module fixed to the other surface of said insulating member with said projecting ends of said riser wires extending through said aperture and bent laterally against said conductive deposits to form contacts therewith and to clamp said module to said insulating member.

2. A module assembly comprising a module, said module including a multiplicity of spaced wafers, a plurality of riser wires forming connections between said wafers, each one of said riser wires projecting at one end beyond said module, an insulating planar member formed with an aperture, a plurality of spaced coatings of conductive material on one surface of said planar member, said conductive coatings extending from said aperture and radiating outwardly to terminal points thereof, said module fixed against the other surface of said insulating member with said projecting ends of said riser wires extending through said aperture and bent laterally against said conductive coatings to form contacts therewith and to clamp said module to said insulating member, connecting means fixed to said terminal points of said conductive paths to interconnect with an electrical circuit, a chassis member, means securing said insulating member to said chassis member, said securing means including structure spacing said insulating member from said chassis member with said connecting means extending between said insulating member and said chassis member.

3. A module assembly comprising a module, said module including a multiplicity of spaced wafers, a plurality of riser wires connecting together said wafers, each one of said riser wires projecting at one end beyond said module, an insulating planar member formed with an aperture, said module positioned against the other surface of said insulating member with said projecting ends of said riser wires extending through said aperture and bent laterally against said conductive strips to form contacts therewith and to clamp said module against said insulating member, a chassis member having an aperture therethrough, means securing said insulating member to said chassis member with said module extending through said chassis aperture, a plurality of strips of conductive material on one surface of said planar member, said conductive strips extending from said planar member aperture and radiating outwardly to terminal points thereof within the periphery of said chassis aperture, connecting means fixed to said terminal points of said conductive strips to interconnect with an electrical circuit, said connecting means extending through said chassis aperture from said other insulating member surface.

References Cited in the file of this patent

UNITED STATES PATENTS

| | | |
|---|---|---|
| 2,524,939 | Stephan et al. | Oct. 10, 1950 |
| 2,616,994 | Luhn | Nov. 4, 1952 |
| 2,629,166 | Marsten et al. | Feb. 24, 1953 |

OTHER REFERENCES

Aerovox Electronic Design, November, 1955, pages 24 and 25.